United States Patent Office 2,838,437
Patented June 10, 1958

2,838,437

MODIFIED MONOALKENE POLYMERS AND METHOD FOR ADHESIVELY BONDING SAME

Warren Froemming Busse and John Anthony Boxler, Wilmington, Del., assignors to E. I. du Pont de Nemours and Company, Wilmington, Del., a corporation of Delaware No Drawing. Application September 20, 1956
Serial No. 610,886

16 Claims. (Cl. 154—139)

This invention relates to modified monoalkene polymers such as polyethylene and to methods for adhesively bonding same.

Heretofore, numerous modifying agents have been applied to polyethylene surfaces to improve the adhesion thereof to various other materials. For example, polyethylene surfaces have been modified by treatment with chromic acid, or other similar oxidizing agents which form oxygenated groups through which improved adhesion to other surfaces is obtained. Other types of modifiers, such as phosphate esters, chlorinated biphenyl, chlorinated paraffin admixed with ammonium sulfamate, etc., have been used to impart adhesiveness to polyethylene surfaces, and thus render polyethylene films, bottles, or the like, printable, and substantive to lacquers, or other adhering materials. Various machines for flaming polyethylene surfaces have been used for similar purposes. In some instances, these methods may have involved the formation of free radicals at the surface. All of these methods have obvious disadvantages. Some of them require expensive equipment. In others, chemicals which are highly corrosive are required, and results achieved are not always satisfactory. A need has therefore arisen for a simple and inexpensive method for imparting to polyethylene the property of adhering to other substances such as metals, plastic films, glass, lacquers, adhesives, inks, etc.

It has been discovered in accordance with this invention that polyethylene and other monoalkene polymers can be made to adhere more readily to other surfaces by having present, in said polyethylene or other monoalkene polymer, a modifier of the class consisting of:

(1) Carboxylic acids having alpha-beta olefinic unsaturation and having hydrogen attached to the alpha carbon atom, (2) Anhydrides of said acids, (3) Carboxylic acids having alpha-beta acetylenic unsaturation, (4) Malonic acid, (5) Mono- and di-alkyl and alkenyl esters of said olefinic, acetylenic, and malonic acids wherein said alkyl and alkenyl groups each contains not more than six carbon atoms, and (6) Salts of malonic acid, of said olefinic and acetylenic acids, and of said monoalkyl and monoalkenyl esters, said salts having carboxylic hydrogen of the acid replaced by a member of the class consisting of ammonium, alkali metals and alkaline earth metals.

The said modifier may be introduced as such into the polymer or formed in situ from one or more precursors thereof, which may be introduced into the polymer to produce the desired modification. For example, alpha-beta olefinic acids can be produced in situ by dehydration of beta hydroxy carboxylic acids. On the other hand, lactic acid has been found to be relatively ineffective, possibly because when heated, it produces a lactone instead of an unsaturated acid. Acids which are effective as precursors include aspartic, itaconic, citric and malic. Among the olefinic acids which are effective per se, may be mentioned maleic, fumaric, acrylic, cinnamic, and aconitic. Methacrylic acid has been found to be relatively ineffective.

The modifier or precursor may be applied to the polymer surface, or to the surface to be adhered thereto, or may be milled into the polymer, or mixed with the polymer during extrusion (to form film, pipe, bottles, etc.), or incorporated in the polymer in any other way. If the modifier is high melting and insoluble in the polyethylene, it is generally advantageous to add it as a very fine powder or in solution. The quantity employed need not exceed a few percent, based on the weight of the polymer. A suitable content of the modifier as measured in the polymer at the interface is about 0.02% to 20% by weight. Concentrations of 0.1% to 5% are usually adequate when the modifier is incorporated within the polymer, as distinguished from surface applications. If an excess of the modifier is used, it may tend to bloom to the surface and actually reduce the adhesion. A quantity sufficient to coat the surface may be used when the surface coating method is employed. When the modifier is applied to the polymer surface, a liquid medium which dissolves the modifier and which also wets, softens, or dissolves the polymer may advantageously be used.

If the polymer is in the form of a powder or in the form of colloidal particles, surface treatment is quite satisfactory, and this is advantageous in the preparation of coatings, paints, polymer blends, and other compositions wherein the adhesive bond is set up between the polymer in particulate form, and the material to which the polymer is to be bonded.

The same procedures are applicable in modifying polymers in the form of fibers which can be used in reinforced plastic structures, rubber articles, films, or the like. Coated fabrics are also obtainable by the method of this invention. Another application of the modified polymers is in the production of felt or other matted structures, non-woven sheets, and the like.

An important embodiment or application of the present invention is the bonding of polyethylene or partially crystalline polypropylene to metal, especially aluminum, copper, brass, tin, galvanized iron, etc. Another use of the invention is in improving the tensile strength of filled polyethylene containing such fillers as carbon, titania, clays, silicas, whitings, etc.

One of the most important applications of the invention is in the manufacture of tear-resistant laminated films which can include aluminum foil, cellophane, and/or nylon film, bonded to polyethylene film. This permits control over permeability by using combinations of lamina which provide barriers to various materials such as water, oils, acetic acid, etc.

The normally solid monoalkene polymers which may be employed in practicing the invention are thermoplastic homopolymers and interpolymers of monalkenes, said polymers having no components other than monoalkenes. Natural or reclaimed rubber, and polymers of dienes are not included unless a monoalkene polymer is also included as one of the components. Monoalkene polymers which by infra-red analysis are found to contain trace amounts of conjugated unsaturation as part of their structure, are not excluded. Typical examples of the normally solid monoalkene polymers are ordinary polyethylene, linear (high density) polyethylene, partially crystalline head-to-tail polypropylene, ethylene-n-decene interpolymers, etc. Many of these polymers can be made readily from the monomers in inert hydrocarbon solvents using $TiCl_4$-$LiAl(alkyl)_4$ catalysts.

In many instances the modified polymers can be adhesively attached to other materials by merely contacting the two materials at sufficiently elevated temperature to soften, i. e. melt, the hydrocarbon polymer, and thereafter cooling the resulting article while maintaining said contact. In those cases where $H_2O$, $CO_2$ or other volatile materials are given off, it is important to cool the sample under positive pressure if porosity is to be avoided. It has also been found to be quite important, in obtaining optimum results, to use temperatures of at least 150° C to 200° C. The reason for this is not fully understood, but it may be that these temperatures are needed for incorporation of oxygen to form free radicals which then add to the unsaturated acids or esters to put carboxyl groups on the polymer.

Whatever the explanation, the modified polymer behaves as if the oxygenated groups present in the modifying agent becomes incorporated in the polymer chemically, with resultant improvement in adhesion. Oxidation inhibitors usually have an adverse effect on the adhesion of polyethylene to aluminum and other polar surfaces. The modifiers of this invention can be made to reduce the deleterious effects of these antioxidants on adhesion.

The effect of the modifier can be demonstrated with clean glass microscope slides which have been flamed to further clean and dry their surfaces. A polyethylene film containing the modifier (3% fumaric acid, incorporated at about 160° C.) is placed in contact with such a slide. Pressure is applied to the "sandwich," encased in aluminum foil, at 200° C. A similar experiment is made with polyethylene which has been heated to about 200° without the modifier. There is very strong adhesion of the polyethylene to the glass and aluminum in the first instance, and no binding whatever of the polyethylene to glass, and poor bonding of the polyethylene to the aluminum, in the second instance.

The invention is illustrated further by means of the following examples.

EXAMPLE I

A solution of 0.6 gram furmaric acid in several cc. acetone was added to 20 grams of commercial low density (0.925) polyethylene fluff. After evaporation of the acetone, the resulting mixture was milled for four minutes between small steam heated rolls (2 inches in diameter, 6 inches long) at 150° C. A similar batch was made at 170° C. and another at 200° C. The modified polyethylenes thus obtained were used in a series of tests in which 3.2 grams of the modified polyethylene was placed in a 2 inch x 3 inch x 0.03 inch cavity backed on each side by metals, as specificed in the table with follows. With the platen temperatures at 200° C. the "sandwich" was placed in the press and preheated for one minute; the pressure was then raised to 20,000 p. s. i. gauge in one minute and allowed to remain at this level for three minutes; the pressure was then raised to 25,000 p. s. i., the heat turned off and cooling water passed through the platens. When the sample reached room temperature, it was removed from the press and tested. Test samples were cut to a width of one inch and a peel was started. The two flaps were then placed in the jaws of a tensile strength tester (Scott) and pulled apart at the rate of 2 inches per minute. The adhesive force was measured by a strain gage. The results were as set forth in the following table.

Table I

ADHESION OF METALS TO MODIFIED POLYETHYLENE (MODIFIER—3% BY WEIGHT OF FUMARIC ACID)

| Milling Temperature (° C.) | Metal | Thickness of Metal (in.) | Adhesion (lb./in.) |
|---|---|---|---|
| 150 | Copper | 0.017 | 13. |
| 150 | aluminum | 0.003 | 6. |
| 170 | tin | 0.017 | more than 22. |
| 170 | galvanized iron | 0.017 | 13. |
| 170 | aluminum | 0.003 | 8. |
| 170 | brass | 0.017 | 8 to 20. |
| 200 | tin | 0.017 | more than 23. |
| 200 | copper | 0.017 | 18. |
| 200 | brass | 0.017 | 11. |

Control samples, prepared without modifier at a milling temperature of 150° C., and using metal sheets of the same thickness as those referred to in the foregoing table, in all instances gave adhesion values no exceeding 1.0 lb./in.

EXAMPLE II

Malonic acid was milled into polyethylene for 10 minutes at 170° C., the quantity of malonic acid being 3 grams per 100 grams of polyethylene. The resulting mixture was bonded to the following materials by contact (under compression) at 200° C., followed by cooling, (the figures given in parentheses being the adhesion in pounds per inch): aluminum (0.8), tin (5), iron (3), nylon resin (greater than 3). A control was run in each instance, without the malonic acid modifier, with the results as follows: aluminum (0.4), tin (0.8), iron (0.0), nylon resin (2).

EXAMPLE III

Diallyl fumarate was applied to an aluminum surface, and polyethylene (ordinary branched type) was bonded to the resulting surface at 220° C. The adhesion of the resulting bond was 10 pounds per inch. A similar experiment with a tin surface instead of aluminum gave an adhesion of 8 pounds per inch; with copper, 1.5; stainless steel 4. Relatively poor results were obtained with 1% dibutyl fumarate milled into polyethylene at 160° C., followed by bonding to these same metals.

EXAMPLE IV

Various amounts of aspartic acid were milled into ordinary (branched) polyethylene on a 4-inch by 6-inch mill, each batch (200 grams) being milled for 20 minutes at 160° C. Samples of each batch were then molded against aluminum films at temperatures of 200° and 220° C., respectively, as in Example I. The force necessary to peel the aluminum from samples one inch wide was then determined. Results are shown in the following table:

| Concentration of Aspartic Acid (weight percent) | Adhesion (lb./in.) when molded at— | |
|---|---|---|
| | 200° C. | 220° C. |
| 0 (control) | 0.5± .5 | 0.2 |
| 0.1 | 3.5±1.0 | 5.0 |
| 0.2 | 3.4±0.1 | |
| 0.5 | 6.6±0.2 | |
| 1.0 | 7.0±0.2 | 7 |

Thus concentrations of above about 0.5% aspartic acid gave best adhesion to aluminum, although lower concentrations also gave some improvement.

These samples had only poor to fair adhesion to iron and almost none to glass. In another test when 3% aspartic acid was milled into 20 grams of polyethylene on a 2-inch by 6-inch mill, the adhesions to aluminum, tin, and iron were, respectively, 6.5±.5, 18±2, and 11±2 lb./in. The corresponding values for the controls without the aspartic acid were 0.4, 1.2, and 0.0 for aluminum, tin, and iron.

This illustrates the point that if the quantity of modifier is too small to produce the desired adhesion, more modifier should be added. The amount of modifier required may be lessened by careful attention to details of cleaning, etc.

EXAMPLE V

Acetylene dicarboxylic acid was added to polyethylene and tested by the procedure of Example IV, with the following results:

| Concentration (percent) | Adhesion (lb./in.) when molded at— | |
| --- | --- | --- |
| | 200° C. | 220° C. |
| 0 (control) | 0.5±0.5 | 0.2 |
| 0.1 | 3.0±1.0 | 4.5 |
| 0.2 | 2.5±.5 | |
| 0.5 | 0.6 | |
| 1.0 | 0.4 | 4.0 |

This illustrates the fact that the optimum concentration can vary with the modifier, at any given curing temperature and that this optimum increases with curing temperature. It is probable that the existence of the optimum is related to the tendency to bloom to the surface.

EXAMPLE VI

Aluminum sheet was wiped with various liquids and molded to polyethylene at various temperatures.

| Treatment of Aluminum | Adhesion (lb./in.) when molded at— | | | |
| --- | --- | --- | --- | --- |
| | 180° C. | 220° C. | 240° C. | 260° C. |
| None | ca. 0.1 | 1.7±0.3 | | 1.7±0.3 |
| diallyl fumarate | ca. 0.1 | 9.5±.5 | 9.0±1 | 7.2±.8 |
| dibutyl fumarate | | 2.7±.2 | 4.5 | 3.1±.9 |
| dibutyl maleate | | 1.2±.8 | 1.9±.6 | 2.7±.2 |

Here the temperature of molding had a profound effect on the adhesion with some materials, the diallyl fumarate, for example, being ineffective in promoting adhesion when molded at 180° C. but being very effective at 220° C. to 260° C.

EXAMPLE VII

This example illustrates the fact that while anti-oxidants tend to reduce the adhesion of polyethylene to metals, this effect can be counteracted to some degree by the use of the present invention.

The samples in the following table were milled at 160° C. with an antioxidant added in different ways. In the first series 1% fumaric acid was added and milled for one minute; then various amounts of "Santowhite" Crystals, 4,4'-thio-bis-(6-t-butyl-m-cresol), were added and the milling continued for 5 minutes. In the second series 0.1% "Santowhite" Crystals was added and milled for one minute; then 1% fumaric acid was added and the milling continued for various times. In each case the batch was molded between aluminum films at 200° C. and the adhesion determined by the peel test described above.

| | First Additive | Milling Time, min. | Second Additive | Milling Time, min. | Adhesion to Aluminum (lb./in.) |
| --- | --- | --- | --- | --- | --- |
| 1 | 1% fumaric acid | 5 | None | | 5.8 ±0.8 |
| 2 | do | 1 | 0.01% "Santowhite" Crystals. | 5 | 3.5 ± .5 |
| 3 | do | 1 | 0.05% "Santowhite" Crystals. | 5 | .7 ± .2 |
| 4 | do | 1 | 0.1% "Santowhite" Crystals. | 5 | .35± .15 |
| 5 | 0.1% "Santowhite" Crystals. | 5 | None | | 0.0 — Fell Apart |
| 6 | do | 1 | 1% fumaric acid | 5 | 2.2 ±1.3 |
| 7 | do | 1 | do | 30 | 1.3 ± .9 |

When this polyethylene without either fumaric acid or "Santowhite" Crystals was molded against aluminum at 200° C., the adhesion was about 0.5 lb. The addition of the "Santowhite" Crystals reduced the normal adhesion of the polyethylene to aluminum from about 0.5 lb./in. to about 0.0, since the aluminum fell off the polyethylene during gentle handling of the sample to prepare it for the adhesion test.

By adding the antioxidant first and then adding the fumaric acid with minimum milling, there was the minimum reduction in adhesion when 0.1% antioxidant was used.

EXAMPLE VIII

Samples of aluminum foil about 3 mils thick were rubbed with a swab wet with diallyl fumarate to leave a thin coat of liquid on the aluminum. These samples, together with samples of untreated aluminum foil were molded against polypropylene, branched polyethylene, and linear polyethylene. The adhesion of the polymers to the aluminum is shown in the following table.

| Polymer | Adhesion (lb./in.) to Aluminum | |
| --- | --- | --- |
| | Untreated | Treated with Diallyl Fumarate |
| Polypropylene | 0.8 | 1.5 |
| Branched polyethylene | 2.0 | 9.2 |
| Linear polyethylene | 0.0 | 7 |

EXAMPLE IX 0.1 and 1% of various acids were added to a branched polyethylene of density 0.923 by milling for 20 minutes at 160° C., and the samples were molded against aluminum at 220° C. The adhesion values are shown in the following table.

| Chemical Added | Adhesion (lb./in.) when concentration was— | |
| --- | --- | --- |
| | 0.1% | 1.0% |
| Malic acid | 6.5 | 0.0 (fell apart) |
| Maleic acid | 5.5 | 4.0 |
| Aconitic acid | 6 | 1 |
| Itaconic acid | 6 | 3.5 |
| Malonic acid | 3 | 3.5 |
| Cinnamic acid | 4 | 2 |

The control with no chemical added had an adhesion of 0.5 lb./in.

These results further illustrate the fact that there can be concentration ranges which give optimum adhesion values, and these ranges may differ for different chemicals.

In similar experiments, glycine and succinic acid, which are relatively stable, gave adhesions as low or lower than the control.

EXAMPLE X

A sheet of aluminum was wiped with an acetone solution (25%) of acrylic acid which had slightly polymerized to a syrupy consistency. This film was allowed to dry and the aluminum was molded to polyethylene at 220° C. The aluminum stuck to the polyethylene so tightly that the polyethylene or the aluminum repeatedly tore when trying to separate them. The control of untreated aluminum molded under the same conditions was easily separated from the polyethylene.

EXAMPLE XI

2% and 10% each of sodium acrylate, magnesium acrylate and calcium acrylate were milled into branched polyethylene, and the samples molded against 3 mil aluminum foil at 220° C. In each case the aluminum stuck so tightly that it could only be removed with great difficulty, and then it usualy tore in small pieces during the operation. The aluminum molded to polyethylene without a modifier could be removed in one piece with relatively little effort.

While the latter example illustrates the use of metal salts, it is to be appreciated that the ammonium salts, it is to be appreciated that the ammonium salts can be used in the same manner.

It is to be understood that the foregoing examples are illustrative and that numerous other embodiments will occur to those who are skilled in the art. Moreover, it is, of course, to be understood that the method of the invention does not produce adhesive bonds between polyethylene and every other possible surface. However, in those instances in which a good bond does not result by direct contact of molten modified polyethylene with the material to be bonded thereto, an intervening layer of an adhering substance may be used. For example, stainless steel and lead are metals which may adhere with difficulty hence should be used with an intervening layer of adhering metal. Certain organic polymeric materials behave similarly and are preferably bonded by use of an intervening layer of nylon resin or other material which adheres better.

Moreover, there are unexplained specific effects which govern the selection of modifier, when optimum results are desired. For instance, diallyl fumarate was found to be a highly effective modifier for bonding polyethylene to aluminum under certain conditions, but was relatively less effective as a modifier for bonding polyethylene directly to iron or tin under the same conditions. In contrast with this, aspartic acid (3%) was effective with iron, tin, and aluminum. Aconitic acid was very effective on nylon and iron, but was much less effective on tin. While specific effects such as this are frequently encountered, and while in particular instances some or all of the modifiers of this invention are relatively ineffective (as for example in bonding smooth polytetrafluoroethylene surfaces to monoalkene polymers), it is nevertheless true that these modifiers have an improving effect on the bonding on monoalkene polymers to a wide variety of surfaces.

We claim:

1. A process for bonding a normally solid monoalkene polymer to a surface which comprises contacting the monoalkene polymer in the molten state with the surface to be bonded therewith, and permitting the surfaces to cool while in contact to produce a solid bond, said molten monoalkene polymer containing as a modifier a member of the class consisting of (1) carboxylic acids having alpha-beta olefinic unsaturation and having hydrogen attached to the alpha carbon atom, (2) anhydrides of said acids, (3) carboxylic acids having alpha-beta acetylenic unsaturation, (4) malonic acid, (5) mono- and di-alkyl and alkenyl esters of said olefinic, acetylenic, and malonic acids wherein said alkyl and alkenyl groups each contains not more than six carbon atoms, and (6) salts of malonic acid, of said olefinic and acetylenic acids, and of said monoalkyl and monoalkenyl esters, said salts having carboxylic hydrogen of the acid replaced by a member of the class consisting of ammonium, alkali metals and alkaline earth metals, whereby the contacted surfaces become bonded more tenaciously than by similar bonding without said modifier.

2. Process of claim 1 where the quantity of said modifier in the polymer is from 0.02% to 20% of the weight of said monoalkene polymer, as measured in the polymer at the interface.

3. Process of claim 2 wherein the monoalkene polymer is polyethylene.

4. Process of claim 3 wherein the modifier is fumaric acid.

5. Process of claim 3 wherein the modifier is diallyl fumarate.

6. Process of claim 3 wherein the acid is itaconic acid.

7. Process of claim 3 wherein the modifier is magnesium acrylate.

8. Process of claim 1 wherein the modifier is aspartic acid.

9. Process of claim 1 in which the modifier is applied to the surface to be bonded to the monoalkene polymer, and this surface is then brought into contact with the molten normally solid monoalkene polymer.

10. A composition having the property of adhering to other substances when brought into contact therewith in the molten state and cooled while in contact to produce a solid bond, which consists essentially of a normally solid monoalkene polymer and, as an adhesion-improving additive, from 0.02 to 20%, by weight of said polymer, of a member of the class consisting of (1) carboxylic acids having alpha-beta olefinic unsaturation and having hydrogen attached to the alpha carbon atom, (2) anhydrides of said acids, (3) carboxylic acids having alpha-beta acetylenic unsaturation, (4) malonic acid, (5) mono- and di-alkyl and alkenyl esters of said olefinic, acetylenic, and malonic acids wherein said alkyl and alkenyl groups each contains not more than six carbon atoms, and (6) salts of malonic acid, of said olefinic and acetylenic acids, and of said monoalkyl and monoalkenyl esters, said salts having carboxylic hydrogen of the acid replaced by a member of the class consisting of ammonium, alkali metals and alkaline earth metals.

11. Composition of claim 10 wherein the said monoalkene polymer is polyethylene.

12. Composition of claim 11 wherein the said additive is fumaric acid.

13. Composition of claim 11 wherein the said additive is diallyl fumarate.

14. Composition of claim 11 wherein the said additive is itaconic acid.

15. Composition of claim 11 wherein the said additive is magnesium acrylate.

16. Composition of claim 11 wherein the said additive is aspartic acid.

References Cited in the file of this patent

UNITED STATES PATENTS 2,609,353   Rubens et al. _____ Sept. 2, 1952